(12) United States Patent
Bocanegra et al.

(10) Patent No.: US 6,459,836 B1
(45) Date of Patent: Oct. 1, 2002

(54) CORRUGATED ARMOR FOR PROVIDING PROTECTION AND TENSILE STIFFNESS

(75) Inventors: Luis M. Bocanegra, Alpharetta; Lisa A. Dixon, Atlanta; Michael D. Kinard, Lawrenceville; Phillip M. Thomas, Suwanee; Robert A. Williams, Duluth, all of GA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/464,093

(22) Filed: Dec. 16, 1999

(51) Int. Cl.[7] ................................................. G02B 6/44
(52) U.S. Cl. .................. 385/107; 385/108; 174/106 D; 174/102 D; 174/126.3
(58) Field of Search ................................ 385/107, 108; 174/106 D, 102 D, 126.3

(56) References Cited

U.S. PATENT DOCUMENTS

| | | | | |
|---|---|---|---|---|
| 2,852,597 A | * | 9/1958 | Raydt | 174/107 |
| 3,667,506 A | * | 6/1972 | Jocteur | 138/156 |
| 4,232,935 A | * | 11/1980 | Rohner | 174/106 D |
| 4,909,593 A | | 3/1990 | Harbort | 350/96.23 |
| 5,777,271 A | * | 7/1998 | Carlson | 174/107 |
| 6,060,662 A | * | 5/2000 | Rafie | 174/106 R |

* cited by examiner

Primary Examiner—Cassandra Spyrou
Assistant Examiner—Leo Boutsikaris
(74) Attorney, Agent, or Firm—Thomas, Kayden, Horstemeyer & Risley, LLP

(57) ABSTRACT

A protective cable armor for cable having tensile stiffness and providing structural protection from invasion by foreign objects. The armor comprises a substantially planar sheet member having a length and a width and an intermittent corrugation pattern disposed therein. The intermittent corrugation pattern comprises at least one land extending across the width of the sheet member and having a defined land width. The intermittent corrugation pattern further comprises at least one, groove extending across the width of the sheet member and having a defined groove width, where the defined land width differs from the defined groove width. The land is disposed adjacent the groove. The sheet member can also be disposed in a substantially tubular form.

25 Claims, 3 Drawing Sheets

CORRUGATED ARMOR FOR PROVIDING PROTECTION AND TENSILE STIFFNESS

BACKGROUND OF THE INVENTION

Communication cables that are strung between poles or those buried in the ground are subject to abuse such as, for example, attack by rodents, mechanical abrasion and crushing. Attacks by gophers and other burrowing rodents on buried cable and by squirrels on aerial cable have been a continuing concern. Testing with gophers has evolved into a normal criteria in the industry for evaluating cables. Gophers, for example, have been shown to exert biting pressure as high as 18,000 psi. Cables having an outside diameter below a critical size of about three-quarters of an inch (0.75") in diameter are more susceptible to being damaged than larger cables because the animals can bite directly down on them, encompassing the entire cable with their jaws. For larger size cables, generally only a scraping or raking action takes place. In fact, on cables exceeding about two inches (2") in diameter, gopher attacks are rarely observed.

It has been found that with limited exceptions, the only way to protect directly exposed cables from rodent attack is to wrap them in a sufficiently hard and tough metallic shield, or an armor. A longitudinally applied shield, if otherwise suitable, would be economically preferable from a manufacturing standpoint. For cables below the critical size, the use of a corrugated shield having a longitudinally overlapped seam generally has provided sufficient protection. Typically, the corrugation pattern disposed on a corrugated shield is in the configuration of substantially uniformly sized and substantially uniformly spaced laterally raised portions and laterally lower portions which, in profile, resemble a sine wave. These corrugated armors, while they provide protection to the cable from rodent attacks and flexibility needed for easy storage and installation, lack tensile stiffness essential to the durability of the cable.

Lately, optical fiber cables have become predominant in the communications cable market. They, when buried in the ground, are subject to rodent attack and when strung between poles are subject to damage by squirrels. Another prior art optical fiber cable sheath system which offers rodent protection comprises two helically wrapped, non-corrugated stainless steel shielding tapes enclosed in a plastic jacket. However, this arrangement has several shortcomings. It is expensive to manufacture because of low line speeds, the complex machinery required to wrap the tapes helically about a core, and the separate steps required to accomplish taping and jacketing.

Yet another prior art optical fiber cable, which offers rodent protection, comprises a corrugated armor shield wrapped around an optical fiber, or fiber bundle, with additional longitudinally extending tensile stiffness members disposed outside the armor where the tensile stiffness members extend the length of the cable. Similar to the armor discussed above, the corrugation pattern of the prior art comprises a substantially symmetric, sinusoidal-like wave pattern. The armor is typically metallic and difficult for a rodent to penetrate, however; while the corrugation pattern provides flexibility, corrugations significantly decrease the tensile stiffness of the armor at low strains. As optical fiber cables typically operate only at low tensile strains (<1%), the corrugated armor alone provides insufficient tensile stiffness to the cable sheath. As such, tensile stiffness is added to the cable with separate components. These components may be, for example, a pair of tensile stiffness members disposed opposite each other, one on either side of the core, many small members distributed in a helix around the outside of the core, a single tensile member located along the longitudinal axis of the cable, or any combination of such members. All of these tensile members, central, distributed and pairs, typically extend the length of the cable.

The prior art configurations described above have several shortcomings. These cables can be more expensive to produce since the functions of structural armor protection and of tensile stiffness are provided by separate components. Furthermore, the cables having diametrically opposed stiffness member systems are more difficult to store and install because such cables resist bending in all but one plane. These cables are also large in diameter, as compared to the core housed within. For cables with many distributed tensile members, more complex manufacturing facilities and more intricate fasteners for cable termination can be required.

As such, it can be seen that a cable having an armor capable of providing tensile stiffness and resistance to penetration by rodents and damage by other mechanical hazards that is also flexible and cost effective to manufacture is needed. Thus, a heretofore unaddressed need exists in the industry to overcome the aforementioned deficiencies and inadequacies.

SUMMARY OF INVENTION

The present invention is a protective cable armor having significant tensile stiffness at low strains and providing structural protection from invasion by foreign objects. The armor comprises a substantially planar sheet member having a length and a width and an intermittent corrugation pattern disposed therein. The intermittent corrugation pattern comprises a series of alternating grooved sections and land sections (non-corrugated portions) adjacent to one another, each with a defined width such that a consistent pattern of grooved and land sections is repeated along the length of the sheet member. The sheet member then can be disposed in a substantially tubular form.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed up on clearly illustrating the principles of the present invention. Moreover, in the drawings, like reference numerals designate corresponding parts throughout the several views.

DETAILED DESCRIPTION OF THE INVENTION

Figure 1A:
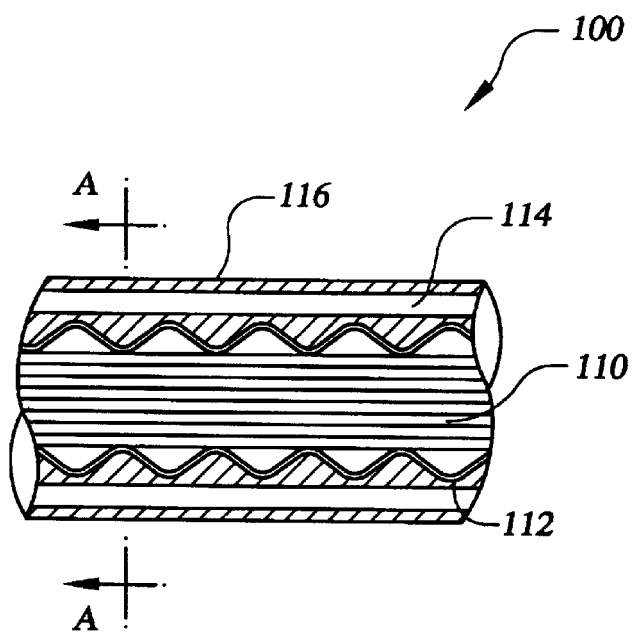
FIG. 1A illustrates a partial cut-away side view of the cable configuration which comprises a prior art corrugated armor.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Figure 1B:
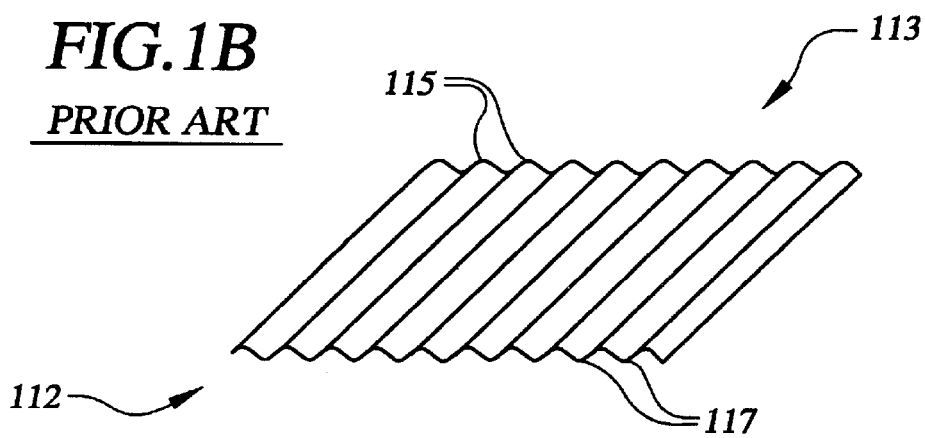
FIG. 1B illustrates a partial perspective view of a prior art armor corrugation pattern installed in the cable illustrated in FIG. 1A.
Figure 1C:
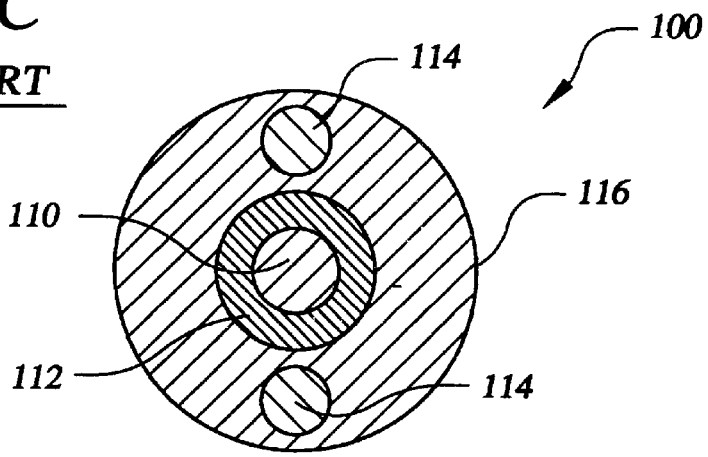
FIG. 1C illustrates a cross-sectional end view taken at section line A—A shown in FIG. 1A of a cable configuration which comprises a prior art corrugated armor a illustrated in FIG. 1B.

FIGS. 1A and 1C illustrate a commonly known prior art rodent resistant cable 100. The cable 100 comprises a core 110, which can comprise any communication-capable line, or lines, such as electric wire(s) or optical fiber(s) in a single protective tube structure, or in multiple protective tube structures bundled together, with or without a binding material. The core 110 is protected most immediately by a layer of armor 112, preferably completely encasing the perimeter of the core 110. As can be seen in FIG. 1B, the preferred prior art armor 112 comprises a corrugation pattern 113 substantially similar to a sinusoidal wave, where each raised portion 115 and adjacent lowered portion 117 are substantially uniform in length and height.

The armor 112 can comprise any of a number of suitably hard and tough materials, but is commonly steel. As such, the armor 112 provides protection to the core 110 from penetration by foreign objects, such as gnawing rodent teeth, while the corrugation pattern 113 provides flexibility. Each turn, or bend, in the substantially sinusoidal corrugation pattern 113 decreases the tensile stiffness of the armor. Such a corrugation pattern decreases the tensile stiffness of the member as a result of the tensile load required to straighten the curves or bends comprising the corrugation being lower than the tensile load required to stretch a flat member. As such, the repeated bends in the prior art corrugation pattern 113 result in a lowered tensile stiffness of the component and thereby a lowered tensile load carrying capacity of the armor 112 at low strain. Since the armor 112 provides little useful tensile stiffness to the cable 100 at low strain, a pair of tensile stiffness members 114 are positioned adjacent the armor 112 and extending the entire length of the cable 100. The tensile stiffness members 114 are typically relatively small diameter members, such as wires, disposed adjacent to the outside of the armor 112 but to the inside of an outer jacket 116. These tensile stiffness members typically comprise either a metal material, such as steel, or a non-metal material, such as an epoxy and glass composite rod, thereby providing the cable 100 with adequate tensile stiffness. The core 110, armor 112 and tensile stiffness members 114 are surrounded by the outer jacket 116. The outer jacket 116 can comprise a flexible material such as polyethylene and provides yet another protective layer for the core 110. This prior art construction of a rodent resistant cable 100 may exhibit limited bending capabilities and may be therefore difficult to install, coil and store. Furthermore, this configuration results in a cable 100 of a relatively large diameter compared to the diameter of the core 110 that the cable 100 contains. Finally, the cost to manufacture the cable 100 can be higher as a result of the number of components used in assembling the cable 100.

Figure 2:
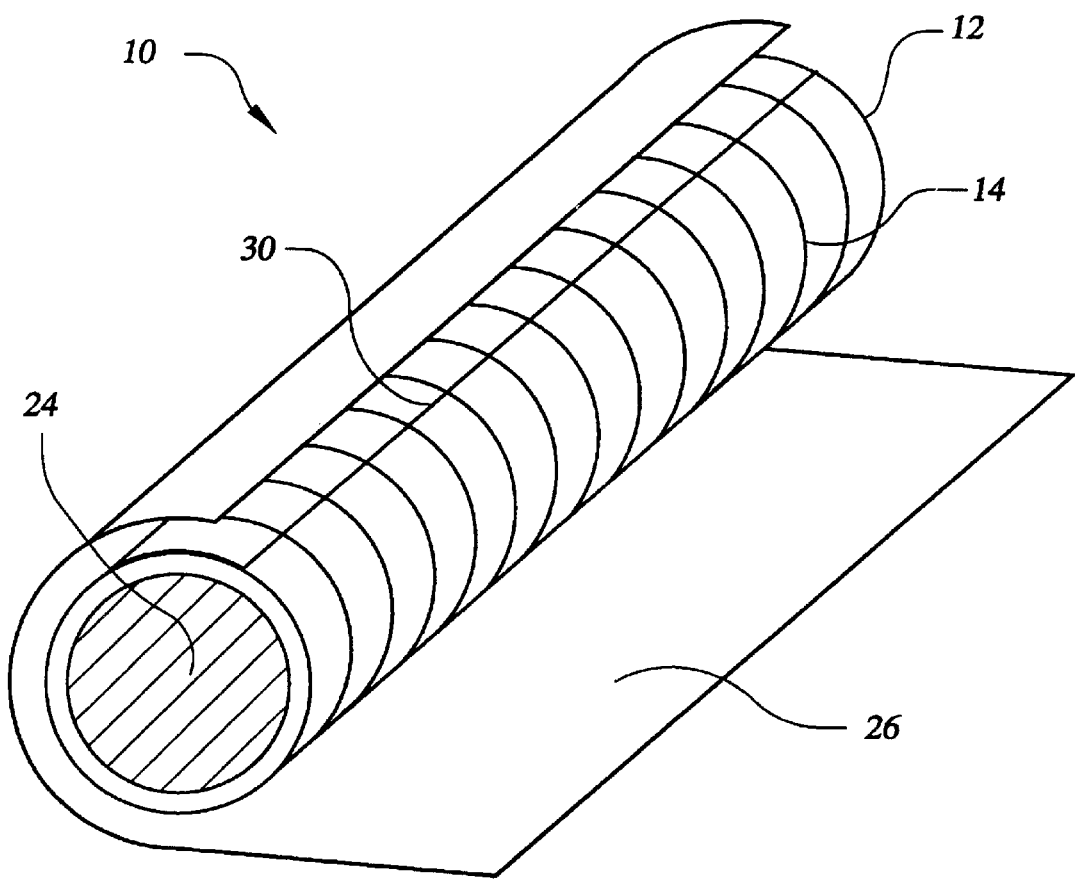
FIG. 2 illustrates a perspective view of armor of the present invention installed in a cable.

With these disadvantages in mind, we turn next to FIG. 2, which illustrates a cable 10 utilizing an interior armor 12 of the present invention. A preferred embodiment of the interior armor 12 of the present invention comprises a sheet of material having a length and a width and an intermittent corrugation pattern 14 disposed therein. The length of the armor 12 preferably substantially corresponds to the length of the cable 10 while the width of the armor substantially corresponds to the circumference of the core 24. Although the armor 12 of the present invention as illustrated and described herein is commonly applied to a core comprising a single tube structure, it should be understood that the armor 12 of the present invention can be applied to a variety of core configurations, including but not limited to those of stranded wire cables, loose tube cables, and slotted core cables. Where the armor 12 of the present invention is included in a cable comprising additional tensile stiffness members, the armor 12 may be used to reduce the size and/or number of tensile stiffness members needed or to add even more tensile stiffness. It should further be noted that the present disclosure is intended to cover all such embodiments and applications.

Figure 4:
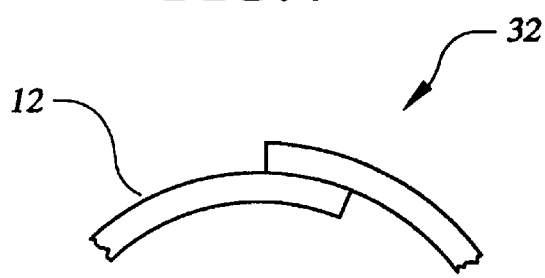
FIG. 4 illustrates exploded view of a seam fixing the armor in a cable, as illustrated in FIG. 2.
Figure 4A:
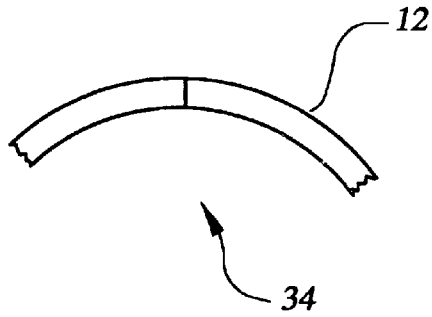
FIG. 4A illustrates an exploded view of an alternative configuration of a seam for fixing the armor in a cable, as illustrated in FIG. 2.
Figure 3:
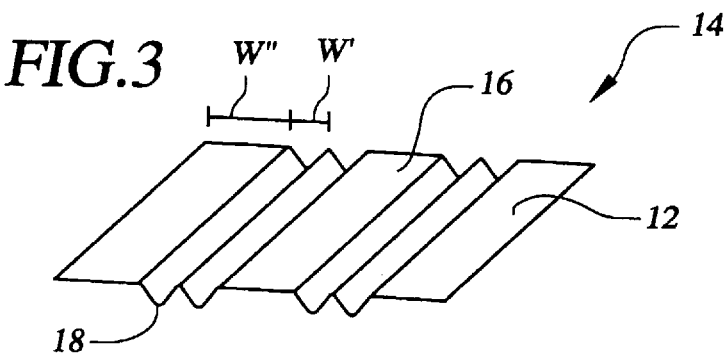
FIG. 3 illustrates a partial perspective view of an embodiment of an intermittent corrugation pattern of the armor illustrated in FIG. 2.
Figure 3A:
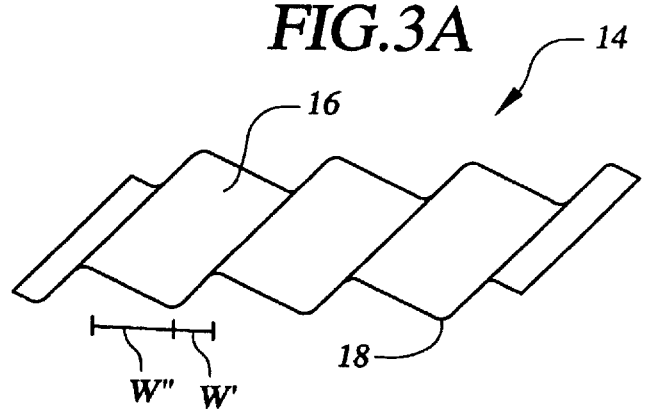
FIG. 3A illustrates a partial perspective view of an embodiment of an intermittent corrugation pattern of the armor illustrated in FIG. 2.
Figure 3B:
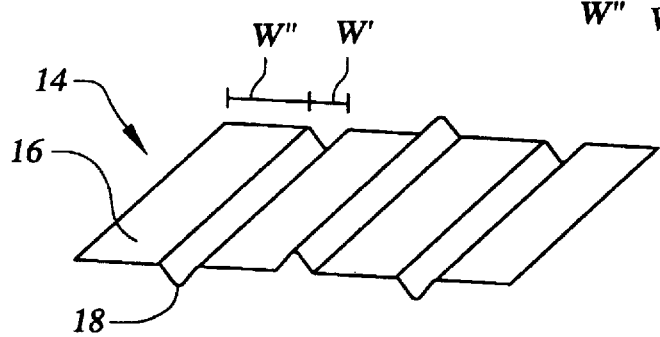
FIG. 3B illustrates a partial perspective view of an embodiment of an intermittent corrugation pattern of the armor illustrated in FIG. 2.
Figure 3C:
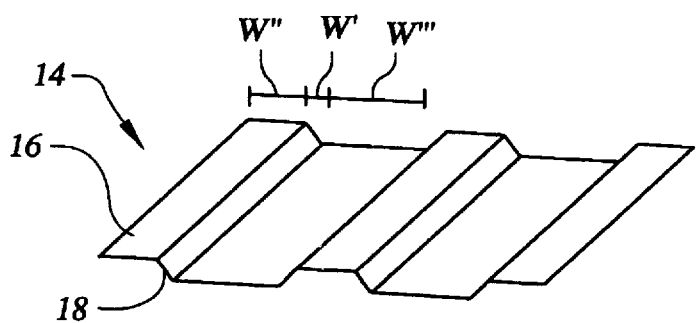
FIG. 3C illustrates a partial perspective view of an embodiment of an intermittent corrugation pattern of the armor illustrated in FIG. 2.
Figure 3D:
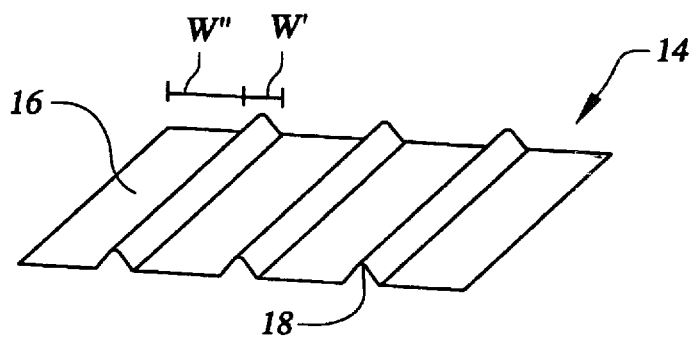
FIG. 3D illustrates a partial perspective view of another alternative configuration of intermittent corrugation pattern of the armor illustrated in FIG. 2.

Turning next to FIGS. 3 through 3D illustrated are five examples of intermittent corrugation patterns 14 that can be disposed in the interior armor 12. Referring first to FIG. 3, illustrated is a first alternative configuration for an intermittent corrugation pattern 14, where grooves 18 alternate with lands 16. As illustrated, this configuration comprises a repeating pattern of a pair of grooves 18 each having a first width (W') and a land 16 of a second width (W"). FIG. 3A illustrates another embodiment of the intermittent corrugation pattern. The pattern 14 comprises alternating and adjacent lands 16 and grooves 18 where the lands 16 are slanted at an angle with the grooves 18 providing the transition therebetween. It is preferable that the defined length W' of the grooves 18 are substantially less than the defined width W" of the lands 16. FIG. 3B illustrates another embodiment of the intermittent corrugation pattern 14. In this configuration, again, there are alternating grooves 18 and lands 16 having differing defined widths, W' and W", respectively. Here the grooves 18 alternate deviating laterally above the lands 16 and deviating laterally below the lands 16. FIG. 3C illustrates yet another embodiment of a possible intermittent corrugated pattern 14. Again, in a combination of alternating ands 16 and grooves 18, a land 16 having a defined width W" transitions via a groove 18 having a defined width W' to another land 16 having a third defined width W'". Similarly, in FIG. 3D the corrugation pattern 14 comprises a plurality of alternating lands 16 and grooves 18. It is preferable that the lands 16 and the grooves 18 alternate in a manner such that the width of a land 16 W"

is adjacent a groove 18 of width W'. In each of these configurations, the lands 16, being substantially flat, provide tensile stiffness while the grooves 18, provide flexibility to the interior armor 12. It is further preferred in each configuration that the lands 16 and grooves 18 both extend along the full width of the sheet of material. The armor 12 can comprise metal, such as steel, or any such suitable material as to provide structural protection and tensile stiffness as well as flexibility when corrugated with an intermittent corrugation pattern, as disclosed herein. It should also be noted that the corrugation pattern 14 of the armor 12 of the present invention can comprise any configuration wherein portions of the pattern 14, typically those that are substantially flat, provide tensile stiffness, alternate with curved portions deviating laterally, either above or below, from the plane of the preceding substantially flat portions. Turning back to FIG. 2, it can be seen that in a preferred application of the armor 12 in a cable 10, having a substantially circular cross-section, it is preferable that the corrugation pattern 14 is oriented substantially perpendicular to a longitudinal axis extending the length of the cable 10 and the armor 12 wrapped around the perimeter of the core 24. The interior armor 12 is preferably disposed around a core 24 such that it is adjacent the surface of the core 24. The core 24 surrounded by the armor 12 of the present invention can comprise any communication cable lines, such as electrical wire(s), optical fiber(s) a protective tube, or bundle of tubes, containing such elements. The armor 12 is preferably fixed around the core 24, typically joined at a seam 30 running longitudinally along the cable 10, as illustrated in FIGS. 4 and 4A. An outer jacket 26 can then be disposed around the interior armor 12. The outer jacket 26 may comprise polyethylene or any such suitable material. In this configuration, the cable 10 has a diameter more closely corresponding to that of the core 24 which it houses and may be substantially flexible equally in all directions.

Looking next to FIGS. 4 and 4A, illustrated are alternative seam 30 configurations for fixing the armor 12 around the core 24. Referring first to FIG. 4, the seam 30 can comprise a longitudinal overlap seam 32 where ends of the armor 12 overlap each other. Also, the ends of the armor 12 may be fixed together in any suitable manner, such as by an adhesive, or the like. As shown in FIG. 4A, the armor 12 may also be fixed about the core 24 with a seam 30 comprising a longitudinal seam 34, wherein ends of the armor 12 are butted together and fixed with a weld, or the like. The armor 12 can also be fixed around the core 24 by the outer jacket 25 itself. It should be understood that although these two fixing configurations are illustrated herein, the armor 12 can be fixed around and adjacent the core 24 in any suitable manner.

Although armor 12 of the present invention is illustrated and disclosed herein as applicable to a cable 10, it should be understood that such reference is not intended to limit the scope of the disclosure herein, and that such armor, providing both tensile stiffness and flexibility may be beneficial in a wide variety of applications.

The foregoing description has been presented for purposes of illustration and description. It is not intended to be exhaustive or to limit the invention to the precise forms disclosed. Obvious modifications or variations are possible in light of the above teachings. All such modifications and variations are within the scope of the invention as determined by the appended claims when interpreted in accordance with the breadth to which they are fairly and legally entitled.

Therefore, having thus described the invention, at least the following is claimed:

1. A protective cable armor for providing tensile stiffness and structural protection of a cable from invasion by foreign objects in the cable, said cable having a core, said armor comprising:
   a substantially planar sheet member having a length, a width and an intermittent corrugation pattern disposed thereon, said width substantially corresponding to a circumference of said core, said corrugation pattern comprising:
      a plurality of spaced lands extending laterally across said width of said sheet, each of said plurality of lands having a defined land width;
      a plurality of grooves alternating with said lands and extending laterally across said width of said sheet, each of said plurality of grooves having a defined groove width differing from said defined land width, each of said plurality of grooves being disposed adjacent at least one of said plurality of spaced lands, and wherein said plurality of grooves comprises grooves disposed on opposite sides of said substantially planar sheet member that are laterally staggered.

2. The protective armor of claim 1, wherein said corrugation pattern is regularly repeated.

3. The protective armor of claim 1, wherein said sheet member is disposed in a substantially tubular form configured to encase a communication cable line therein.

4. The protective armor of claim 1, wherein said armor is disposed around at least one optical fiber.

5. The protective armor of claim 1, wherein said armor further comprises a metal.

6. A protective cable armor for providing tensile stiffness and structural protection of a cable from invasion by foreign objects, said armor comprising:
   a substantially planar sheet member having a length and width and having an intermittent corrugation pattern disposed thereon, said corrugation pattern comprising:
      at least two pairs of grooves extending along said width of said sheet member, each of said pairs of grooves having a width and a land extending along said width of said sheet member between said pairs.

7. A rodent resistant cable comprising:
   a core having a longitudinal axis, said core comprising a communication cable line;
   an interior armor, said interior armor having an intermittent corrugation pattern disposed therein, wherein said interior armor is arranged and configured to provide tensile stiffness and structural protection, said interior armor being disposed around and adjacent said core, and wherein said corrugation pattern comprises at least two pairs of grooves and a land extending between said pairs of grooves.

8. The cable of claim 7, further comprising:
   an outer jacket, said outer jacket being arranged and configured to protect said interior armor, wherein said outer jacket is disposed around and adjacent said interior armor.

9. The cable of claim 7, wherein said core comprises optical fiber.

10. The cable of claim 7, wherein said corrugation pattern is oriented substantially perpendicularly to a longitudinal axis of said cable.

11. The cable of claim 7, wherein said interior armor is fixed around said core with a longitudinal overlapped seam fixed with adhesive.

12. The cable of claim 7, wherein said interior armor is fixed around said core with a longitudinal weld seam.

13. The cable of claim 7, wherein said interior armor comprises a metal material.

14. The cable of claim 7, wherein said interior armor comprises a plastic material.

15. The cable of claim 8, wherein said outer jacket comprises polyethylene.

16. A rodent resistant cable comprising:

a communication means for communicating at least one signal therethrough;

an interior protective means including an intermittent corrugation pattern for providing tensile stiffness and structural protection to said communication means, wherein said interior protective means is disposed around said communication means;

an outer cover means for covering said interior protective means, wherein said outer cover means is disposed around and substantially adjacent said interior protective means; and wherein said intermittent corrugation pattern comprises alternating grooves and lands, wherein said grooves and lands are of defined lengths, said lengths extending axially along said cable and forming a repeated pattern axially along said cable, and wherein each of said grooves extends radially in an opposite direction to that in which an immediately proceeding groove radially extends.

17. The protective armor of claim 6, wherein said corrugation pattern is regularly repeated.

18. The protective armor of claim 6, wherein said sheet member is disposed in a substantially tubular form configured to encase a communication cable line therein.

19. The protective armor of claim 6, wherein said armor is disposed around at least one optical fiber.

20. The protective armor of claim 6, wherein said armor further comprises a metal.

21. A protective cable armor for providing tensile stiffness and structural protection of a cable from invasion by foreign objects, said armor comprising:

a substantially planar sheet member having a length, a width and an intermittent corrugation pattern disposed thereon, said corrugation pattern comprising:

a plurality of spaced lands extending laterally across said width of said sheet, each of said plurality of spaced lands having a defined land width, each of said plurality of spaced lands being slanted at an angle relative to said length; and a plurality of grooves alternating with said lands and extending laterally across said width of said sheet, each of said plurality of grooves having a defined groove width differing from said defined land width, each of said plurality of grooves being disposed adjacent at least one of said plurality of spaced lands and providing a transition therebetween.

22. The protective armor of claim 21, wherein said corrugation pattern is regularly repeated.

23. The protective armor of claim 21, wherein said sheet member is disposed in a substantially tubular form configured to encase a communication cable line therein.

24. The protective armor of claim 21, wherein said armor is disposed around at least one optical fiber.

25. The protective armor of claim 21, wherein said armor further comprises a metal.

\* \* \* \* \*